(12) United States Patent
Lüthi et al.

(10) Patent No.: US 12,025,735 B2
(45) Date of Patent: *Jul. 2, 2024

(54) COORDINATE MEASURING DEVICE HAVING AUTOMATIC TARGET OBJECT RECOGNITION

(71) Applicant: LEICA GEOSYSTEMS AG, Heerbrugg (CH)

(72) Inventors: Thomas Lüthi, Aarau (CH); Roger Steger, Bremgarten (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 938 days.

This patent is subject to a terminal disclaimer.

(21) Appl. No.: 17/036,841

(22) Filed: Sep. 29, 2020

(65) Prior Publication Data

US 2021/0025978 A1 Jan. 28, 2021

Related U.S. Application Data

(63) Continuation of application No. 15/835,354, filed on Dec. 7, 2017, now Pat. No. 10,901,070.

(30) Foreign Application Priority Data

Dec. 22, 2016 (EP) .................... 16206368

(51) Int. Cl.
*G01S 7/48* (2006.01)
*G01C 15/00* (2006.01)
*G01S 17/66* (2006.01)
*G01S 17/87* (2020.01)

(52) U.S. Cl.
CPC .......... *G01S 7/4802* (2013.01); *G01C 15/002* (2013.01); *G01C 15/006* (2013.01); *G01S 17/66* (2013.01); *G01S 17/87* (2013.01)

(58) Field of Classification Search
None
See application file for complete search history.

(56) References Cited

U.S. PATENT DOCUMENTS

| | | | |
|---|---|---|---|
| 10,901,070 B2* | 1/2021 | Lüthi | G01S 7/4802 |
| 2007/0267498 A1* | 11/2007 | Marsh | G01C 11/04 |
| | | | 235/454 |
| 2010/0007739 A1 | 1/2010 | Otani et al. | |
| 2010/0253933 A1 | 10/2010 | Guieze et al. | |
| 2012/0113406 A1 | 5/2012 | Bockem et al. | |
| 2012/0120391 A1 | 5/2012 | Dold et al. | |
| 2012/0124850 A1 | 5/2012 | Ortleb et al. | |
| 2014/0373369 A1 | 12/2014 | Böckem | |

(Continued)

FOREIGN PATENT DOCUMENTS

| | | |
|---|---|---|
| CN | 104142505 | 11/2014 |
| CN | 105452806 A | 3/2016 |

(Continued)

*Primary Examiner* — Luke D Ratcliffe
(74) *Attorney, Agent, or Firm* — Maschoff Brennan

(57) ABSTRACT

The present invention relates to a coordinate measuring device for detecting a position of a target object which can move in space and which comprises a retroreflector, wherein an automatic identification of a recognized target object and an assignment of specifications associated with the target object takes place.

9 Claims, 5 Drawing Sheets

(56) References Cited

U.S. PATENT DOCUMENTS

| | | | |
|---|---|---|---|
| 2015/0043007 A1* | 2/2015 | Kwiatkowski | G01S 7/48 |
| | | | 356/498 |
| 2015/0316375 A1 | 11/2015 | Winter | |
| 2016/0252619 A1 | 9/2016 | Markendorf | |

FOREIGN PATENT DOCUMENTS

| | | |
|---|---|---|
| DE | 10 2010 024014 A1 | 12/2011 |
| DE | 10 2012 221760 A1 | 5/2014 |
| EP | 2 068 117 A2 | 6/2009 |
| EP | 2 141 450 A1 | 1/2010 |
| EP | 3018446 A1 | 5/2016 |
| WO | 01/04575 A1 | 1/2001 |
| WO | 2007/079600 A1 | 7/2007 |
| WO | 2007/079601 A1 | 7/2007 |
| WO | 2010/057169 A2 | 5/2010 |
| WO | 2010/148525 A1 | 12/2010 |
| WO | 2012/141810 A1 | 10/2012 |

\* cited by examiner

COORDINATE MEASURING DEVICE HAVING AUTOMATIC TARGET OBJECT RECOGNITION

CROSS-REFERENCE TO RELATED APPLICATIONS

This application is a continuation of U.S. patent application Ser. No. 15/835,354, filed Dec. 7, 2017, which claims priority to European Patent Application No. 16206368.9, filed Dec. 22, 2016. The foregoing patent applications are incorporated herein by reference.

FIELD OF THE INVENTION

The present invention relates to a coordinate measuring device for detecting a position of a target object which can move in space and which comprises a retroreflector, wherein an automatic identification of a recognized target object and an assignment of specifications associated with the target object takes place.

BACKGROUND

Coordinate measuring devices designed for continuously tracking a target point and determining the position of this point on the basis of coordinates can be collectively referred to using the term "laser tracker" in general and, in particular, in conjunction with industrial metrology. A target point can be represented, in this case, by a retroreflecting unit (i.e., a cubic prism) which is sighted by an optical measurement beam of the measuring device, in particular a laser beam. The laser beam is reflected, in parallel, back to the measuring device, wherein the reflected beam is detected by a detection unit of the device. A direction of the emission or reception of the beam is determined in this case, for example by means of sensors for angle measurement, the sensors being assigned to a deflection mirror or a sighting unit of the system. In addition, upon detection of the beam, a distance from the measuring device to the target point is determined, for example by means of a propagation time measurement or a phase difference measurement.

Laser trackers according to the prior art can be designed to include, in addition, an optical image capturing unit comprising a two-dimensional, photosensitive array, for example a CCD or CID camera or a camera based on a CMOS array, or to include a pixel array sensor and an image processing unit. The laser tracker and the camera can be mounted with respect to each other in such a way, in particular, that their positions relative to each other cannot be changed. The camera is rotatable, for example together with the laser tracker, about its essentially vertical axis, but is pivotable up and down independently of the laser tracker and, therefore, is disposed separately from the optical system of the laser beam, in particular. Furthermore, the camera can be designed to be pivotable about only one axis, for example depending on the particular application. In alternative embodiments, the camera can be installed together with the laser optical system, in an integrated design, in one shared housing.

For the purpose of measuring distance, laser trackers from the prior art comprise at least one distance measuring device, wherein the distance measuring device can be designed as an interferometer (IFM), for example. Since such distance measuring devices can only measure relative changes in distance, so-called absolute distance measuring device (ADM) are installed, in addition to interferometers, in present-day laser trackers. Such a combination of measurement means for distance determination is known, for example, in the form of the AT901, a product from Leica Geosystems AG. A combination of an absolute distance measuring device and an interferometer for determining distance with the aid of an HeNe laser is known, for example, from WO 2007/079600 A1.

In addition, in modern tracker systems, a deviation of the received measurement beam from a zero position is determined on a sensor, in an increasingly standardized manner. By means of this measurable deviation, a position difference between the center of a retroreflector and the incidence point of the laser beam on the reflector can be determined and, depending on this deviation, the orientation of the laser beam can be corrected or adjusted in such a way that the deviation on the sensor is reduced, in particular is "zero", and therefore the beam is oriented in the direction of the center of the reflector. By adjusting the laser beam orientation, continuous target tracking of the target point can take place and the distance and position of the target point relative to the measurement device can be continuously determined. The adjustment can be implemented in this case by means of a change in orientation of the deflection mirror, which can be moved by means of a motor and which is provided for deflecting the laser beam, and/or by means of a pivoting of the sighting unit which comprises the beam-guiding laser optical system.

Laser trackers according to the prior art regularly comprise, for the purpose of continuous target tracking, a tracking area sensor in the form of a position-sensitive detector (PSD), wherein measurement laser radiation reflected on the target can be detected on the detector. In this context, a PSD is understood to mean an area sensor which functions in an analog manner with respect to position, with the aid of which a centroid of a light distribution on the sensor surface can be determined. The output signal of the sensor is generated, in this case, by means of one or multiple photosensitive areas and depends on the particular position of the centroid of light. The output signal can be evaluated and the centroid can be determined with the aid of a downstream or integrated electronics system. The determination of the position of the centroid of the incident light spot can take place very rapidly and with a very high resolution in this case. With the aid of the PSD, however, only one centroid of the light distribution can be determined, and a distribution of multiple light spots cannot be determined.

With the aid of this PSD, a deviation of the incidence point of the detected beam from a servocontrol zero point can be determined and, on the basis of the deviation, the laser beam can be aligned with the target. For this purpose, and in order to achieve a high level of accuracy, the visual field of this PSD is selected to be comparatively small, i.e., corresponding to the beam diameter of the measurement laser beam.

A detection carried out using the PSD takes place coaxially to the measurement axis, and therefore the detection direction of the PSD corresponds to the measurement direction. The use of the PSD-based tracking and the fine-sighting can take place only after the measurement laser has been oriented toward a retroreflecting target.

The described target tracking must be preceded by a coupling of the laser beam to the reflector. For this purpose, a detection unit comprising yet another position-sensitive sensor (PSD) having a relatively large visual field can be additionally disposed on the tracker. In addition, additional illumination means are integrated in devices of the type in question, with the aid of which the target or the reflector is illuminated, in particular with a defined wavelength which differs from the wavelength of the distance measuring means. In this context, the sensor can be designed to be sensitive to a range around this certain wavelength, in order to reduce or completely impede extraneous light influences. The target can be illuminated by means of the illumination means, and an image of the target including the illuminated reflector can be captured by the camera. By means of the imaging of the specific (wavelength-specific) reflection on the sensor, the reflection position can be resolved in the image and, therefore, an angle relative to the detection direction of the camera and a direction to the target or the reflector can be determined. One embodiment of a laser tracker comprising such a target-seeking unit is known from WO 2010/148525 A1, for example.

Commonly used laser trackers now comprise, as standard, an automatic target recognition and target tracking function for prisms used as target reflectors (ATR: "automatic target recognition"). For this purpose, a separate ATR light source—for example, a multimode fiber output which emits optical radiation having a wavelength in the range of 850 nm—and a special ATR detector (for example, a CCD area sensor) which is sensitive to this wavelength are commonly integrated in the laser tracker. In order to ensure the functioning of the automatic sighting based on the evaluation of the position of the reflection spot of the ATR measurement beam, which has been retroreflected on the prism, on the ATR area sensor, it is typically required to orient the sighting unit, before starting the function, approximately toward the target reflector at least in such a way that the retroreflected ATR measurement beam is also incident on the ATR area sensor. To this end, for example, a manual sighting of the target reflector based on an estimation by the eye can take place or an automatic coarse sighting function can be carried out in advance.

The manual, coarse sighting of the target object can be carried out by the user, on the one hand, by viewing and sighting the target object on a user display of the display control unit directly on the coordinate measuring device or on the display of a separate peripheral device (for example, a data logger as remote control). This often takes place, however, as usual, by viewing the target through an eyepiece of a telescope (i.e., the sighting unit), since a display image displayed on the display control unit or the data logger can be inadequately recognizable in practical use, for example in sunlight.

Problems with the automatic target recognition and target tracking function can occur when the target moves so abruptly and rapidly that it disappears from the visual range of the ATR detector (i.e., ATR measurement radiation reflected on the target is no longer incident on the ATR area sensor). In order to hold the target in the "coupled" state even during rapid and abrupt movements, and to not lose the target from the visual range of the ATR detector, yet another camera (which is sensitive in the visual wavelength range), for example, can capture images of the target and, on the basis of image processing, can track movements of the target (or movements of objects moving along with the target) and, thus, in the event that the target is lost from the "coupled" state, can make it easier to locate and couple the retroreflector again. Such a system is described, for example, in EP 2 141 450.

Laser trackers perform measurements on retroreflectors, for example hollow corner (CCR, having a 1.5", 7/8", 0.5" diameter of the steel ball), triple prisms, N2 (etalon) or cat's eye reflectors. In this case, it is necessary to know the reflector type, since, on the one hand, the position of the cube corners (in the center of the sphere) is measured and the workpiece is touched by the surface of the sphere and, on the other hand, some reflector types (triple prisms/cat's eye) have an addition constant which deviates from zero. It is important that the correct reflector type be used in compensation measurements, in particular.

Laser trackers from the prior art have the disadvantage that the utilized reflector must be manually entered in the software each time, which, in the case, for example, of measurements carried out over relatively long distances or on multiple different target objects, requires a considerable amount of effort and time, for example when target objects that have not yet been correctly identified must first be manually verified.

One substantial disadvantage of conventional laser trackers and target objects is, in particular, an insufficient robustness against a false identification of the target object (e.g., of the reflector type), for example in the case of multiple target objects located in the visual field. In addition, the complex transmission of the target object identities of the particular target objects to the laser tracker has proven to be disadvantageous in some of the known laser trackers from the prior art.

SUMMARY

One problem addressed by some embodiments of the invention is therefore that of providing a more robust and less error-prone coordinate measurement system.

Yet another problem addressed some embodiments of by the invention is that of providing a coordinate measuring device and a target object for a more efficient and simplified coordinate measurement.

These problems are solved by the implementation of the characterizing features of the independent claims. Features that refine the invention in an alternative or advantageous manner are found in the dependent claims.

Some embodiments of the invention relate to a target object for a coordinate measuring device, in particular a laser tracker, wherein the target object comprises a retroreflective element which can be used within the scope of a coordinate measurement of the target object with the aid of an optical measurement beam of the coordinate measuring device. The target object further comprises an identification element which is visible to and recognizable by the coordinate measuring device, wherein the identification element comprises at least one element from the following group: a retroreflecting identification element which retroreflects only radiation of a defined ID color covering at least one certain wavelength range, an identification element having a defined ID color covering at least one certain wavelength range, and an identification element having a defined ID pattern, in particular made of retroreflecting material.

Specifically, the identification element is designed to be rotationally asymmetrical with respect to a target axis of the coordinate measuring device defined within the scope of the coordinate measurement. This embodiment has the advantage that the identification element can also be utilized for detecting the spatial orientation of the target object and/or for roughly locating the target object.

The invention further relates to a coordinate measuring device, in particular a laser tracker, for detecting a position of a target object which can move in space and which comprises a retroreflector, for example a target object as described above, wherein the coordinate measuring device at least comprises a radiation source for emitting an optical measurement beam, wherein the measurement beam is emitted in a defined spatial direction by means of a beam directing unit and thus defines a target axis, and the coordinate measuring device also comprises a distance measuring functionality for determining a distance to the target object by means of the measurement beam, an angle measuring functionality for determining a direction of emission of the measurement beam, a target tracking functionality for the continuous tracking of the target object, and an evaluation and control unit for data storage and for the control of the coordinate measuring device.

An HeNe laser light source or a laser diode source can be utilized, in particular, as the radiation source. The measurement beam can be used for different functionalities and, for example, can also consist of a coaxial or parallel combination of multiple components (individual beams), for example consisting of an infrared laser measurement beam for the distance and angle measuring unit, a (visual) pointing beam, for example as visual support for an operator, and a separate target tracking component.

The distance measuring unit is typically designed as a laser rangefinder, for example by means of a propagation time measurement or a phase difference measurement or by means of the Fizeau principle. In particular, the distance measuring unit can also be designed as an absolute distance measuring device. Such distance measuring devices are known in the form of the AT901, a product from Leica Geosystems AG, for example, and a combination of an absolute distance measuring device and an interferometer for determining distance with the aid of a HeNe laser is known, for example, from WO 2007/079600 A1.

The measurement beam is reflected on a target object, wherein the reflected beam is detected by a detection unit of the coordinate measuring device. In this case, a direction of emission or reception of the beam is determined, for example, by means of sensors for angle measurement, in particular angle encoders.

For example, the measurement beam can be coupled to a retroreflector of a target object within the scope of an, in particular, automatic target recognition functionality. To this end, for example, a separate (dedicated) target recognition camera, for example comprising a position-sensitive sensor having a relatively large visual field or an initially mentioned ATR detector, can be utilized. In addition, additional illumination means are often integrated into devices of the type in question, in particular for generating a recognition radiation having a defined wavelength which differs from the wavelength of the distance measuring means. In this context, the sensor can be designed to be sensitive to a range around this certain wavelength, in order to reduce or completely impede extraneous light influences.

Within the scope of the target tracking functionality, in modern systems, a deviation of the received beam from a zero position, for example, is determined on a sensor, in an increasingly standardized manner By means of this deviation which can be measured in this way, a position difference between the center of a retroreflector and the incidence point of the laser beam on the reflector can be determined and, depending on this deviation, the orientation of the laser beam can be corrected or adjusted in such a way that the deviation on the sensor is reduced, in particular is "zero", and therefore the beam is oriented in the direction of the center of a reflector. By adjusting the laser beam orientation, continuous target tracking of the target point can take place and the distance and position of the target point relative to the measurement device can be continuously determined. The adjustment can be implemented in this case by means of a change in orientation of a deflection mirror, which can be moved by means of a motor and which is provided for deflecting the laser beam, and/or by means of a pivoting of the sighting unit which comprises the beam-guiding laser optical system.

In particular, the target recognition functionality, the target tracking functionality, and the distance and angle measuring functionality can be provided, for example, by means of separate, dedicated detectors and/or cameras comprising a suitable camera optical system, or one or several detectors and/or cameras can be designed and used in such a way that several of the aforementioned functionalities can be carried out therewith.

The evaluation and control unit records and processes the measurement values of different sensors, for example a distance measuring device, angle encoders for determining a relative or absolute axis position, and controls axis-position motors in order to orient the beam directing unit.

The coordinate measuring unit according to some embodiments of the invention further comprises a target object database which is stored in the evaluation and control unit and provides information for a set of individual target objects, at least including specifications assigned to each of the individual target objects, and ID colors, each of which is assigned to an individual target object, can be unambiguously differentiated from one another and cover at least one certain wavelength range, wherein precisely one ID color is assigned to precisely one target object; a camera which is sensitive to the spectrum of the wavelength ranges of the ID colors, is referred to in the following as an ID camera, and is based, in particular, on a CCD or CMOS sensor, for example having a viewing direction essentially along the target axis; and illumination means for illuminating a target object with an identification radiation covering the spectrum of the wavelength ranges of the ID colors, for example by means of white light and/or color LEDs containing individual ID colors.

An (ID) color, or a wavelength range defining an (ID) color (or, generally, a wavelength range), can be defined, for example, based on radiation of a single, sharply delimited wavelength; and/or based on radiation of a single (contiguous) spectral range; and/or based on a spectrum of wavelength ranges which are adjacent to each other or are spaced apart from each other, as necessary. In particular, a mixture and/or combination of multiple wavelength ranges defines a "mixed color", i.e., a "color" in the sense of an ID color, provided a (mixed) ID color generated in this way differs from the other (original) ID colors to an extent that is adequate for the ID camera and is recognized by the ID camera as an intrinsic color.

According to some embodiments of the present invention, within the scope of an identification functionality automatically controlled by the evaluation and control unit, a target object to be identified is irradiated with the identification radiation, wherein a determination of an ID color for the target object takes place based on an image of the target object captured with the aid of the ID camera, an automatic identification of the target object takes place based on the ID color of the target object, and wherein an, in particular, automatic allocation of the assigned specifications to the target object takes place based on the information provided by the target object database.

In particular, a camera which is already present in the system can be adapted in such a way that it can also be used, for example, as an ID camera, for example:
  a detection camera for detecting the measurement beam for the distance measuring and/or angle measuring functionality, a target recognition camera for the target recognition functionality, a target tracking camera for the target tracking functionality, and a camera for providing an overview image for a user.

In one embodiment, the coordinate measuring device has, for example, a target recognition functionality for orienting the measurement beam toward the target object, in particular including a regulating unit for an automatic search and recognition of the target object, wherein the target recognition functionality is implemented by means of a recognition radiation provided in a defined wavelength range within the scope of the target recognition functionality, in particular being generated by the illumination means generating the identification radiation or by additional target recognition illumination means, in particular wherein the ID camera is sensitive to at least one portion of the wavelength range of the recognition radiation and is provided for use as a target recognition camera, in particular wherein the recognition radiation is provided in a defined wavelength range outside of the spectrum of the wavelength ranges of the ID colors, and/or the portions of the recognition radiation returning from the target object are taken into consideration, in particular are masked, by the evaluation and control unit, within the scope of the identification functionality, in an image of the target object captured with the aid of the ID camera; or the target recognition functionality is implemented with the aid of a dedicated target detection camera and the ID camera is insensitive to the wavelength range of the recognition radiation; or the target recognition functionality is implemented with the aid of a dedicated target recognition camera and the recognition radiation is provided in a defined wavelength range outside of the spectrum of the wavelength ranges of the ID colors, in particular wherein the target recognition camera is insensitive to radiation from the spectrum of the wavelength ranges of the ID colors, and/or the portions of the identification radiation returning from the target object are taken into consideration, in particular are masked, by the evaluation and control unit, within the scope of the target recognition functionality, in an image of the target object captured with the aid of the target recognition camera.

Depending on the embodiment of the illumination means and/or the cameras used, the target object can be illuminated simultaneously or in alternation with the identification radiation and the recognition radiation, for example wherein the identification illumination means are switched on only in order to identify the recognized target object.

Depending on the embodiment, the illumination means for the identification radiation and the recognition radiation can be in the form of separately controllable illumination components, for example different LEDs, or they can be designed, for example, as an individual illumination component which can provide different radiation, in particular depending on the presently intended use.

For example, a suitable detector which is sensitive only in the spectrum of the wavelength ranges of the ID colors or a suitable camera filter in the entrance optical system of the camera can be utilized for the target recognition camera.

Yet another aspect of some embodiments of the invention relate to a coordinate measuring device, in particular a laser tracker, for detecting a position of a target object which can move in space and which comprises a retroreflector, wherein the coordinate measuring device at least comprises a radiation source for emitting an optical measurement beam, wherein the measurement beam is emitted in a defined spatial direction by means of a beam directing unit and thus defines a target axis, and the coordinate measuring device also comprises a distance measuring functionality for determining a distance to the target object by means of the measurement beam, an angle measuring functionality for determining a direction of emission of the measurement beam, a target tracking functionality for the continuous tracking of the target object, and an evaluation and control unit for data storage and for the control of the coordinate measuring device.

The coordinate measuring unit further comprises a target object database which is stored in the evaluation and control unit and provides information for a set of individual target objects, at least including specifications assigned to each of the individual target objects and values of differentiation parameters assigned to each of the individual target objects, wherein the differentiation parameters comprise at least one element from the following group: a parameter which stands for a total retroreflective capability of a target object, in particular a ratio of radiation incident on the target object with respect to the portion of the incident radiation which has been retroreflected on the particular target object, and a parameter which stands for an aperture size of the retroreflector of a target object, in particular a diameter or an area of an image of the retroreflector of the particular target object captured with the aid of a area detector from a defined distance.

According to some embodiments of the present invention, within the scope of an identification functionality automatically controlled by the evaluation and control unit for a target object to be identified, at least one identification element from the following group is determined: a value of the intensity signal of the target object registered with the aid of an intensity detector, a diameter or an area of an image of the target object captured with the aid of an area detector; wherein an automatic identification of the target object takes place based on the determined identification element, in particular wherein, for the purpose of the identification, the identification element is set into relation to a distance to the target object determined with the aid of the distance measuring functionality, and an allocation of the assigned specifications to the target object takes place based on the information provided by the target object database.

In one embodiment, the distance measuring functionality comprises an absolute distance measuring unit and the identification of the target object takes place based on a distance to the target object measured with the aid of the absolute distance measuring unit.

In particular in the case of a laser tracker having absolute distance measurement, the accuracy of the distance measurement depends on the distance measurement being based on a sufficiently stable clock signal (driver clock) having a known reference frequency. The reference frequency (or the driver clock) must therefore be checked and, if necessary, adjusted typically periodically, for example at predefined service intervals. This check typically takes place using suitable measurement means, for example based on a rubidium frequency standard, for the purpose of which an interface—which is accessible for service—is often provided on the laser tracker or on the distance measuring module of the laser tracker, for example for an electrical coupling of a test device to the laser tracker, for example, via a HF connector.

The disadvantage thereof, however, is that one (or several) complex interface (or interfaces) may often be necessary for the transmission of (electronic) test signals, for example several signals—to be monitored—from the test unit to the laser tracker, which results, for example, in additional expenditure in terms of hardware, electronics, and therefore also results in high costs. A check of the driver clock using very high frequencies (for example, in the GHz range), for example, is often made difficult as a result.

Yet another problem addressed by the invention is therefore that of providing an improved calibration method for a driver clock, in particular for use in an absolute distance measurement module, specifically in a laser tracker.

According to some embodiments of the present invention, the driver clock signal to be calibrated is modulated onto an optical beam of the system, i.e., the laser tracker in this case, in particular an optical beam which is already present, having been provided, for example, by a suitably designed distance measuring module. In principle, any type of modulation can be used for this purpose, for example an amplitude modulation. The signal source can be configurable, in particular, and can permit an output of several signals to be monitored and can be completely switched off, if necessary.

This approach allows for an easily accessed, contactless measurement of the driver clock or of the reference frequency, by means of a receiver unit of a comparatively simple test device, for example by means of a light detector. Since optical radiation is used as a signal carrier, it is also possible, in particular, to output very high frequencies (~GHz) even without complex interfaces.

Yet another embodiment is characterized in that the intensity detector is used in at least one of the following functions: as a dedicated identification detector of the coordinate measuring device, as a receiver of the distance measuring functionality, in particular wherein the intensity detector is used within the scope of at least one of the following distance measuring units: a unit for measuring propagation time, an interferometer unit, a WFD unit, a FMCW unit, a frequency comb unit, a phase distance measuring unit, and a Fizeau absolute distance measuring unit, as a tracking detector of the target tracking functionality, in particular being designed as a position-sensitive detector (PSD), as a target recognition detector of a target recognition functionality of the coordinate measuring device for orienting the measurement beam toward the target object, or as a target recognition detector of a stereo target recognition functionality for orienting the measurement beam toward the target object and for determining a distance to the target object.

The area detector can be used in at least one of the following functions: as a dedicated identification detector of the coordinate measuring device, as a tracking detector of the target tracking functionality, in particular being designed as a position-sensitive CCD- or CMOS-camera, as a target recognition detector of a target recognition functionality of the coordinate measuring device for orienting the measurement beam toward the target object, as a target recognition detector of a stereo target recognition functionality of the coordinate measuring device for orienting the measurement beam toward the target object and for determining a distance to the target object, or as a camera for providing an overview image for a user.

Since the measured intensity of a target object irradiated with the measurement beam or, for example, with a dedicated tracking illumination, depends mainly on the type of the target object—aperture, size, design, etc.—and the distance to the target object, a state of the target object can be derived, for example a defect of the target object or a degree of soiling, within the scope of the automatic identification of the target object, on the basis of the intensity and—if necessary—distance information, provided there is prior knowledge of the recognized target object.

Yet another specific embodiment is characterized in that the identification within the scope of the automatic identification of the target object defines a first comparison parameter, yet another identification of the target object based on an alternative method takes place, in particular an alternative manual or automatic method, for example wherein a user manually enters the expected type of target object and assigned state data via an input module of the evaluation and control unit, wherein the further identification defines a second comparison parameter, and a comparison, in particular an automatic comparison of the first comparison parameter with the second comparison parameter takes place by way of the evaluation and control unit and, on the basis of the comparison, a state of the target object is derived, in particular a defect or a degree of soiling of the target object.

The state of the target object can then be made visible to a user, for example, and can be taken into account within the scope of the coordinate measurement, if necessary.

Yet another aspect of some embodiments of the invention relates to a coordinate measuring device, in particular a laser tracker, for detecting a position of a target object which can move in space and which comprises a retroreflector, wherein the coordinate measuring device at least comprises a radiation source for emitting an optical measurement beam, wherein the measurement beam is emitted in a defined spatial direction by means of a beam directing unit and thus defines a target axis, and the coordinate measuring device also comprises a distance measuring functionality for determining a distance to the target object by means of the measurement beam, an angle measuring functionality for determining a direction of emission of the measurement beam, a target tracking functionality for the continuous tracking of the target object, and an evaluation and control unit for data storage and for the control of the coordinate measuring device.

The coordinate device further comprises illumination means for illuminating the target object with an identification radiation in a defined wavelength range, in particular being designed as an LED, a camera referred to in the following as an ID camera which is sensitive at least to a portion of the wavelength range of the identification radiation, in particular based on a CCD- or CMOS-sensor, and a target object database which is stored in the evaluation and control unit and provides information for a set of individual target objects, at least including specifications assigned to each of the individual target objects, positions assigned to the individual target objects or deviations from the target axis in an image captured by the ID camera of the individual target object irradiated with the illumination means, depending on a distance between the coordinate measuring device and the individual target object, a lateral diameter of the retroreflector of the individual target object, and a lateral distance between an optical axis of the illumination means and an optical axis of the ID camera.

According to some embodiments of the present invention, within the scope of an identification functionality for the target object to be identified, the target object is detected with respect to the target axis, wherein, automatically controlled by the evaluation and control unit, a determination of the distance between the coordinate measuring device and the target object takes place by means of the distance measuring functionality, a determination of a position of the target object takes place in an image—captured with the aid of the ID camera—of the target object irradiated with the identification radiation, an automatic identification of the target object takes place based on the determined distance and the determined position of the target object in the image captured by the ID camera, and an allocation of the assigned specifications to the target object takes place based on the information provided by the target object database.

According to one embodiment, the illumination means are designed, for example, as multiple individual light sources, in particular as LEDs, which are mounted on the sides of the entrance optical system of the ID camera, wherein the optical axes of the individual light sources each have different lateral spacing from the optical axis of the ID camera, in particular wherein the individual light sources generate radiation in defined wavelength ranges which differ from each other.

The latter is advantageous, for example, for an identification and differentiation within the scope of an image processing of an image—which has been captured with the aid of the ID camera—of the radiation—from individual, simultaneously switched-on light sources—reflected on the target object.

Yet another embodiment is characterized in that at least one first light source of the illumination means is also provided as sighting illumination means for a target recognition functionality of the coordinate measuring device for orienting the measurement beam toward the target object, in particular wherein the first light source provides a portion of the identification radiation and the recognition radiation, for example in alternation depending on the present intended use, or superimposed.

Specifically, the individual light sources of the illumination means can be switched on and off by the evaluation and control unit simultaneously or separately, in particular sequentially, wherein a switching on and/or off of the light sources is temporally linked to an image-capturing by means of the ID camera.

Yet another aspect of some embodiments of the invention relates to a coordinate measuring device, in particular a laser tracker, for detecting a position of a target object which can move in space and which comprises a retroreflector, for example a target object as described above, wherein the coordinate measuring device at least comprises a radiation source for emitting an optical measurement beam, wherein the measurement beam is emitted in a defined spatial direction by means of a beam directing unit and thus defines a target axis, and the coordinate measuring device also comprises a distance measuring functionality for determining a distance to the target object by means of the measurement beam, an angle measuring functionality for determining a direction of emission of the measurement beam, a target tracking functionality for the continuous tracking of the target object, and an evaluation and control unit for data storage and for the control of the coordinate measuring device.

The coordinate measuring device further comprises a target object database which is stored on the evaluation and control unit and provides information for a set of individual target objects, at least including specifications assigned to each of the individual target objects and ID patterns which are assigned to each of the individual target objects and which can be unambiguously differentiated from one another, wherein precisely one ID pattern is assigned to precisely one target object, a camera referred to in the following as an ID camera, in particular based on a CCD- or CMOS-sensor, in particular wherein the ID camera is designed to have a zoom lens having an adjustable magnification based on a distance to the target object measured with the aid of the distance measuring functionality, and the viewing direction of the camera is along an axis which is parallel or coaxial to the target axis.

Within the scope of an identification functionality automatically controlled by the evaluation and control unit, a determination of an ID pattern for the target object takes place based on an image of the target object captured with the aid of the ID camera, an automatic identification of the target object takes place based on the ID pattern of the target object, and an, in particular automatic, allocation of the assigned specifications of the target object takes place based on the information provided by the target object database.

According to one embodiment, the determination of the ID pattern for the target object takes place, in this case, by adjusting a defined image scale of the image captured with the aid of the ID camera, and/or capturing an image with the aid of the ID camera in a defined image scale by means of a suitable adjustment of the zoom lens based on a distance of the target object measured with the aid of the distance measuring functionality.

Yet another aspect of some embodiments of the invention relates to a coordinate measuring system comprising a coordinate measuring device, in particular a laser tracker, and a target object comprising a retroreflector, wherein the coordinate measuring device at least comprises a radiation source for emitting an optical measurement beam, wherein the measurement beam is emitted in a defined spatial direction by means of a beam directing unit and thus defines a target axis, and the coordinate measuring device also comprises a distance measuring functionality for determining a distance to the target object by means of the measurement beam, an angle measuring functionality for determining a direction of emission of the measurement beam, a target tracking functionality for the continuous tracking of the target object, and an evaluation and control unit for data storage and for the control of the coordinate measuring device.

The coordinate measuring device further comprises a first transmitter unit for transmitting a query signal having a first defined wavelength range, in particular modulated radiation having a defined modulation frequency, a camera which is sensitive to a second wavelength range and which has a viewing direction along the target axis for capturing a response signal from at least one target object, and a target object database which is stored on the evaluation and control unit and provides information for a set of individual target objects, at least comprising specifications assigned to each of the individual target objects and query and response signals assigned to each of the individual target objects.

The target object further comprises a receiver unit which is sensitive to the first wavelength range, a second transmitter unit for emitting a response signal having a defined wavelength range which includes at least a portion of the second wavelength range, and a control electronics system, in particular a microprocessor, which is in a power-saving mode, wherein the control electronics system can be activated by the receiver unit with the aid of a wake-up signal which is specific for the target object, in order to exit the power-saving mode.

According to some embodiments of the present invention, at least one target object irradiated with the aid of the first transmitter unit is automatically identified by means of the evaluation and control unit and an allocation of the assigned specifications of the target object takes place based on the information provided by the target object database, based on a transmission of a query signal by the first transmitter unit of the coordinate measuring device based on the information provided by the target object database, and a reception of the transmitted query signal with the aid of a first receiver unit of at least one first target object, wherein, in the event of conformance of the query signal received by the receiver unit of the first target object with the wake-up signal which is specific for the first target object, the control electronics system of the first target object is activated and the target object transmits, by means of the second transmitter unit, a response signal which is captured by the camera, and the identity of the target object irradiated with the query signal is derived by the evaluation and control unit.

One embodiment is characterized, for example, by the fact that the query signal is specific for the first target object, and wherein the response signal confirms the identity of the first target object, in particular wherein a coarse position of the first target object relative to the coordinate measuring device is derived on the basis of an image of the response signal captured by the camera. As a result, for example, a targeted search and sighting of a certain target object can take place.

In yet another embodiment, the query signal is a trigger signal, wherein, due to the trigger signal, the first target object transmits a response signal, wherein the evaluation and control unit can derive the identity of the first target object based on the response signal and the information provided by the target object database, in particular wherein a coarse position of the first target object relative to the coordinate measuring device is derived on the basis of an image of the response signal captured by the camera. As a result, for example, a search of available target objects and/or a verification of positions of available target objects can take place.

Yet another aspect of the invention relates to a coordinate measuring device, in particular a laser tracker, for detecting a position of a target object which can move in space and which comprises a retroreflector, wherein the coordinate measuring device at least comprises a radiation source for emitting an optical measurement beam, wherein the measurement beam is emitted in a defined spatial direction by means of a beam directing unit and thus defines a target axis, and the coordinate measuring device also comprises a distance measuring functionality for determining a distance to the target object by means of the measurement beam, an angle measuring functionality for determining a direction of emission of the measurement beam, a target tracking functionality for the continuous tracking of the target object, and an evaluation and control unit for data storage and for the control of the coordinate measuring device.

The coordinate measuring device may further comprise a target object database which is stored in the evaluation and control unit and provides information for a set of individual target objects, at least comprising specifications assigned to the individual target objects, and ID colors, each of which is assigned to an individual target object, can be unambiguously differentiated from one another and cover at least one certain wavelength range, wherein precisely one ID color is assigned to precisely one target object; a camera which is sensitive to the spectrum of the wavelength ranges of the ID colors, is referred to in the following as an ID camera, and is based, in particular, on a CCD- or CMOS-sensor, wherein, within the scope of an identification functionality automatically controlled by the evaluation and control unit, a determination of an ID color for the target object takes place based on an image of the target object captured with the aid of the ID camera, an automatic identification of the target object takes place based on the ID color of the target object, and an, in particular, automatic allocation of the specifications to the target object takes place based on the information provided by the target object database.

Since this embodiment does not necessarily require an identification radiation, but rather can be operated merely by means of the available—variable—ambient light or by means of the radiation of illumination means, for example for the target recognition, an identification element detected by the ID camera has, on the one hand, a comparatively low intensity and, on the other hand, a color influenced by the wavelength range of the ambient light.

In this embodiment, it is therefore advantageous when, for example within the scope of an, in particular, automatic target recognition functionality, not only is the target object recognized, but an automatic localization of the recognized target object also takes place, the localization being temporally linked by the evaluation and control unit to an image captured with the aid of the ID camera.

The coordinate measuring device according to some embodiments of the invention is described in the following with reference to exemplary embodiments schematically represented in the drawings merely by way of example. Identical elements in the figures are labeled with identical reference numbers. The embodiments described are generally not represented true to scale and are also not to be understood to be a limitation.

Specifically:

DETAILED DESCRIPTION

Figure 1:
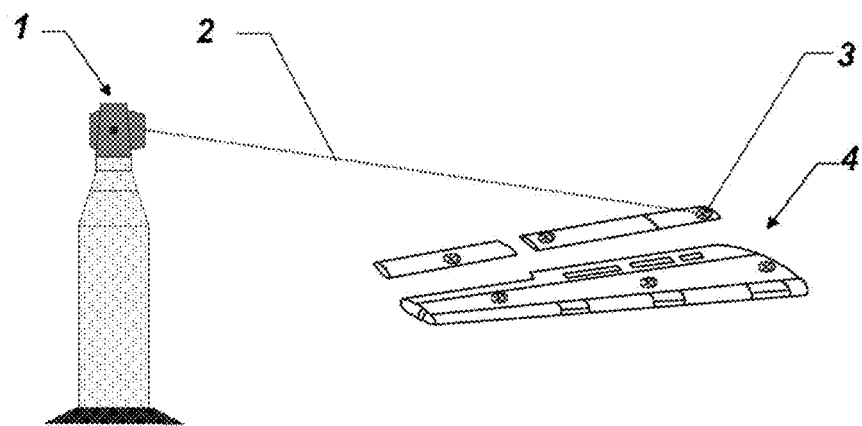
FIG. 1: shows an example of a typical application of a coordinate measuring device according to the invention in industrial metrology.

FIG. 1 shows an exemplary embodiment of a coordinate measuring device 1, which is designed, in this case, as a laser tracker in industrial metrology, for scanning surfaces of manufactured objects 4 using a scanning laser measurement beam 2 and determining the spatial dimensions of the objects in the form of coordinates. Measurements are often carried out in this case with the aid of retroreflectors 3 for the laser measurement beam 2 of the laser tracker 1, for example by means of several target objects attached to the object 4 to be measured.

In order to detect and to be able to track movements of the object to be measured, so that the laser measurement beam 2 remains oriented on the retroreflector 3, the laser tracker 1 typically comprises a target recognition unit and a target tracking unit, in order to ensure continuous tracking of a retroreflector 3 detected by the laser tracker 1 with the aid of the laser beam 2 and, in this way, the distance and position of the target point relative to the laser tracker 1 can be continuously determined.

The type of a presently detected retroflector must be known, since, on the one hand, the retroreflector 3 typically has an offset with respect to the position to be effectively measured, which offset is known and differs depending on the type of mounting. On the other hand, different reflector types, for example, triple prisms, cat's eye, have different optical correction factors, for example an addition constant which deviates from zero. In the case of compensation measurements in particular, it is important that the correct reflector type be known and that the correct optical specifications and compensation parameters be applied within the scope of a measurement using the coordinate measuring device 1.

Figure 2:
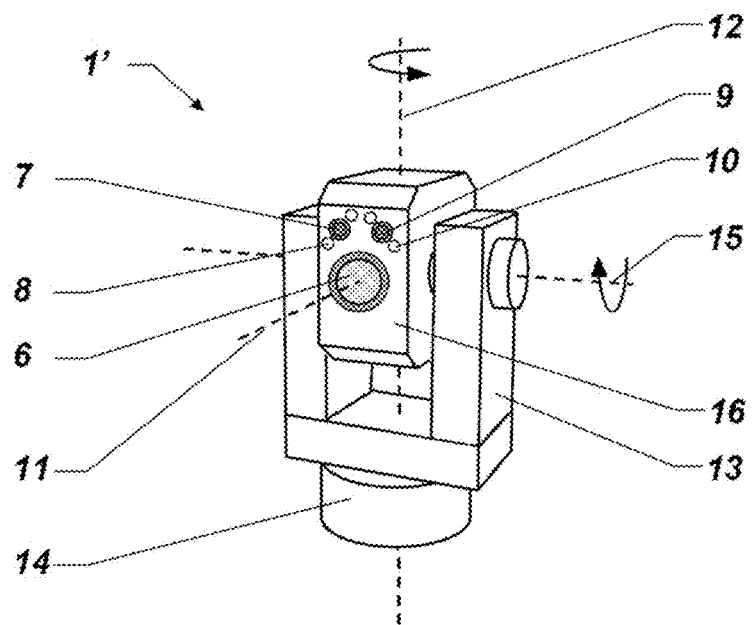
FIG. 2: shows a schematic external layout of an exemplary coordinate measuring device.

FIG. 2 schematically shows the external layout of an exemplary laser tracker 1' comprising the elements: an entrance and exit optical system 6, a target recognition camera 7 including sighting illumination means 8, in this case by means of two light sources on two sides of the entrance optical system of the target recognition camera 7, and an overview camera 9 including overview illumination means 10, in this case likewise including two individual light sources on two sides of the entrance optical system of the overview camera 9. Further shown are: the target axis 11, a pivot axis 12, about which the support 13 can rotate with respect to a base 14, and a tilting axis 15, about which the beam directing unit 16 can tilt with respect to the support 13.

A regulation and control unit (not shown here) records and processes the measurement values from various sensors, for example a distance measuring device, angle encoders for determining a relative or absolute axis position, and controls axis-position motors in order to orient the beam directing unit 16. A display device (not shown) shows information regarding measurements and the device state and can also display images from one of the available image sensors, in particular the overview camera 9. Alternatively, the target recognition camera 7 can also comprise more than one optical system.

Figure 3A:
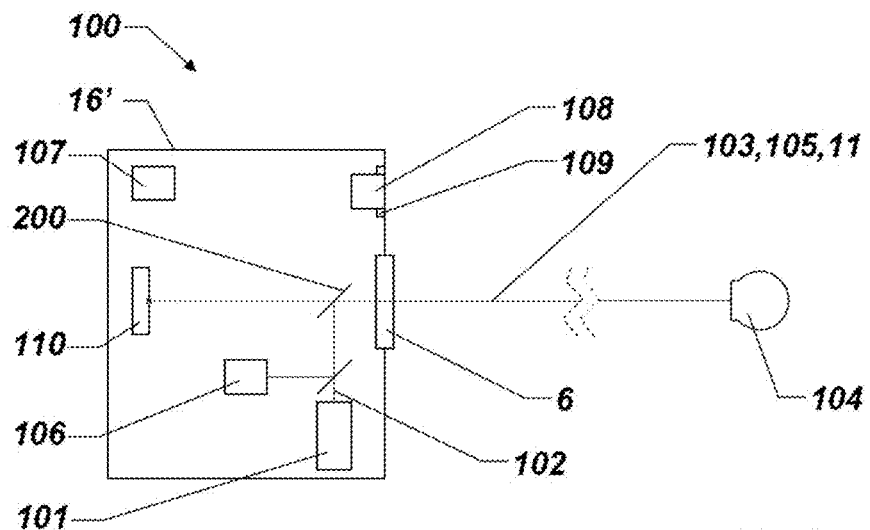
FIGS. 3a,b: show a schematic layout of two coordinate measuring devices according to the invention comprising one (a) or several (a) beam sources for generating a measurement beam and a tracking beam, and comprising one (a) or several (b) specific cameras.
Figure 3B:
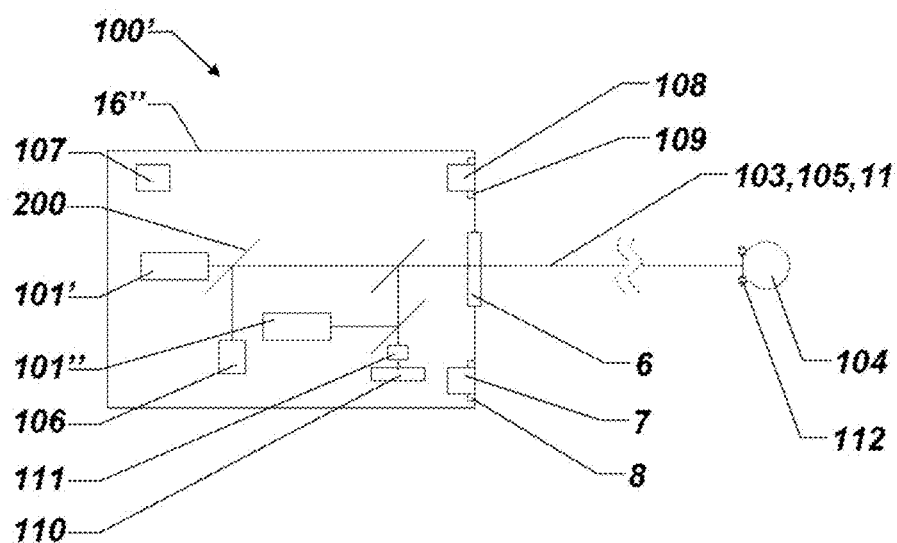

FIGS. 3a and 3b illustrate different embodiments of a coordinate measuring device according to the invention with reference to a schematic layout.

FIG. 3a shows a coordinate measuring device 100 according to the invention comprising a beam directing unit 16' including a beam source 101, the radiation 102 of which is used both as measurement radiation 103 for determining the distance to the target object 104 as well as a tracking beam 105 for the purpose of tracking. Furthermore, the coordinate measuring device 100 comprises an evaluation and control unit 107 for data storage and for controlling the coordinate measuring device 100, the evaluation and control unit also being situated, for example, in this case, in the beam directing unit 16'.

The beam directing unit 16' comprises, on the front side thereof facing the target object 104, an entrance and exit optical system 6 for emitting radiation along the target axis 11 and for receiving reflected radiation, and comprises an identification camera, which is referred to in the following as an ID camera 108, comprising identification illumination means 109, which are designed in this case, for example, as two LED light sources on two sides of the entrance optical system of the ID camera 108, wherein a suitably adapted target recognition camera, for example, is used as the ID camera 108, which is also provided as an overview camera, if necessary, for providing an overview image for a user.

In the example shown, the identification illumination means 109 provides an identification radiation covering a spectrum of wavelength ranges, and a recognition radiation in a defined wavelength range outside of the spectrum of the identification radiation.

Alternatively, further separate, specific cameras can also be used as a target recognition camera and/or an overview camera (see, for example, FIG. 3b) and/or separate illumination means for generating the identification radiation and the detection radiation, in particular wherein the illumination means generates radiation of different wavelength ranges or the cameras have a different wavelength-dependent sensitivity. In addition, an image—which has been captured with the aid of a camera which is used for several functions, for example the ID camera 108 as in this case, which is simultaneously used as a target recognition camera—can also be optimized for a particular purpose by the evaluation and control unit 107 by means of image processing, in particular with respect to an identification of a recognized target object 104 or a target recognition of a target object 104.

The camera optical system of the ID camera 108 can be designed, in particular, as a fixed-focus lens having a fixed focus and a fixed zoom, or as a zoom lens.

The beam directing unit 16' further comprises, in the interior thereof, a distance measuring device 106 for receiving the reflected measurement radiation 103 and for determining a distance to a target object 104. In the example shown, the distance measuring device 106 is an absolute distance measuring device, although it can also be an interferometer, or a combination of the two.

Furthermore, in this case, the beam directing unit 16' comprises a planar tracking detector 110 for receiving the tracking beam 105 reflected on the target object 104 and for generating an output signal for controlling a target tracking functionality of the coordinate measuring device 100.

Preferably, the optical axes of the tracking beam 105 and the measurement beam 103 outside of the coordinate measuring device 100 extend coaxial with each other and with the target axis 11, i.e., on a shared emission axis, as shown here. Alternatively, however, embodiments are also possible, which have a parallel arrangement of the axes or an arrangement in which the axes extend only approximately in parallel to each other, for example only with respect to a remote convergence in the case of measurements across great distances.

Although not shown here, the coordinate measuring device 100 and/or the beam directing unit 16' can also contain further components which are typical for coordinate measuring devices for target tracking, of course, for example an additional overview camera, additional illumination means, a zoom or varifocal camera, fixed or switchable filter devices for cameras, a pointer beam source, etc.

In addition, the beam directing unit 100 comprises a number of beam splitters 200, by means of which the measurement radiation 103 and the tracking beam 105 are emitted along the target axis 11 through the entrance and exit optical system 6 and by means of which the radiation reflected by the target object 104 is directed toward the distance measuring device 106 and the sensor surface of the tracking detector 110.

FIG. 3b shows yet another embodiment of a coordinate measuring device 100' according to the invention, wherein, in this case, a beam directing unit 16" includes a first radiation source 101' for generating a measurement radiation 103, and a second radiation source 101" for generating a tracking beam 105. Furthermore, the coordinate measuring device 100' comprises an evaluation and control unit 107 for data storage and for controlling the coordinate measuring device 100', which, in this case, is also situated, for example, in the beam directing unit 16". The beam directing unit 16" comprises, on the front side thereof facing the target object 104, an entrance and exit optical system 6 for emitting radiation along the target axis 11 and for receiving reflected radiation, and comprises an identification camera, which is referred to in the following as an ID camera 108, comprising identification illumination means 109, which are designed in this case, for example, as two LED light sources on two sides of the entrance optical system of the ID camera 108, wherein the ID camera is also provided as an overview camera for providing an overview image for a user. In the embodiment shown, the beam directing unit 16" also comprises a separate target recognition camera 7 including sighting illumination means 8 which are designed in this case, for example, as two LED light sources on two sides of the entrance optical system of the target recognition camera 7.

The beam directing unit 16" further comprises, in the interior thereof, a distance measuring device 106 for receiving the reflected measurement radiation 103 and for determining a distance to a target object 104. In the example shown, the distance measuring device 106 is an absolute distance measuring device, although it can also be an interferometer, or a combination of the two.

Furthermore, the beam directing unit 16" comprises a tracking detector 110 for receiving the tracking beam 105 reflected on the target object 104, for example including a determination of an incidence point of the reflected tracking radiation on a position-sensitive detector, and for generating an output signal for controlling a target tracking functionality of the coordinate measuring device 100'.

Preferably, the optical axes of the tracking beam 105 and the measurement beam 103 (which can also be identical) outside of the coordinate measuring device 100' extend coaxial with each other and with the target axis 11, i.e., on a shared emission axis, as shown here. This presupposes that the two beam sources 101', 101" comprise a shared exit optical system 6. A shared entrance and exit optical system 6 having two beam paths means that the two beam paths exit from the device into the surroundings of the device or enter the device from the surroundings of the device through the same optical element, such as a lens or a disk. The beam paths are generally at least approximately coaxial in this case.

In addition, the beam directing unit 100' comprises a number of beam splitters 200, by means of which the measurement radiation 103 and the tracking beam 105 are emitted along the target axis 11 through the entrance and exit optical system 6 and by means of which the radiation reflected by the target object 104 is directed toward the distance measuring device 106 and the sensor surface of the tracking detector 110.

The measurement radiation 103 and the tracking beam 105 differ, in particular with respect to the polarity and/or wavelength thereof, in such a way that, by virtue of a suitable embodiment of a filter 111 positioned ahead of the tracking detector 110, the reflected radiation intended for the distance measurement is filtered out and does not reach the tracking detector 110. Likewise, any incoming external interference radiation can be filtered out in this way, and therefore only radiation of the tracking beam 105 reaches the sensor of the tracking detector 110. Alternatively or in addition, by virtue of a suitable embodiment of the beam splitter 200, the totality of the reflected radiation can be divided into a portion intended for the distance measurement and a portion intended for the target tracking.

Also indicated is a target object 104, according to the invention, comprising identification elements 112, which are situated, for example, on the reflector collar of the retroreflector of the target object 104. Exemplary embodiments of identification elements 112 are represented in FIGS. 4a to 4d.

Figure 4A:
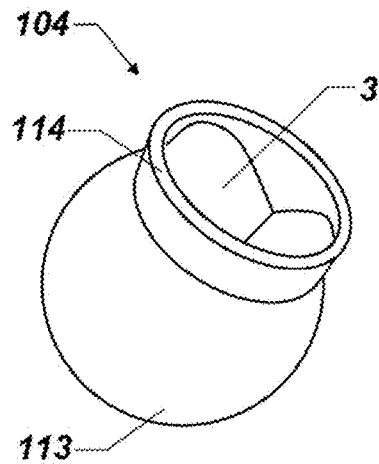
FIGS. 4a-d: show a schematic layout of typical target objects according to the invention comprising identification elements for a passive (a-c) or an active (d) identification.

FIG. 4a shows a typical target object 104 comprising a housing 113, which is designed as a sphere in this case, for a retroreflector 3. Typical target objects comprising retroreflectors include, for example, "hollow corner" retroreflectors, triple prisms, etalon reflectors, or "cat's eye" reflectors. In the case of measurements carried out with the aid of a coordinate measuring device 100, 100' (see FIGS. 3a and 3b), it is necessary to know the reflector type, since, on the one hand, the position of the cube corners (in the center of the sphere) is measured and, for example, the workpiece to be measured is touched by the surface of the sphere and, on the other hand, some reflector types (triple prisms/cat's eye) have an addition constant which deviates from zero. It is important that the correct reflector type be used in compensation measurements, in particular. In the prior art, the reflector that is used must be entered manually, which can be time-consuming and error-prone, depending on the application.

According to the present invention, a target object 104 is automatically identified by the coordinate measuring device 100, 100' (see FIGS. 3a and 3b). To this end, the coordinate measuring device 100, 100' comprises a target object database which is stored in the evaluation and control unit 107 and provides information for a set of defined target objects, at least including one set of identification features and specifications for a target object.

In this case, a target object according to the invention, in a special embodiment, comprises, for example, an identification element which is specific for the target object and is situated, for example, on the reflector collar 114 which is automatically detected by the coordinate measuring device 100, 100'.

Figure 4B:
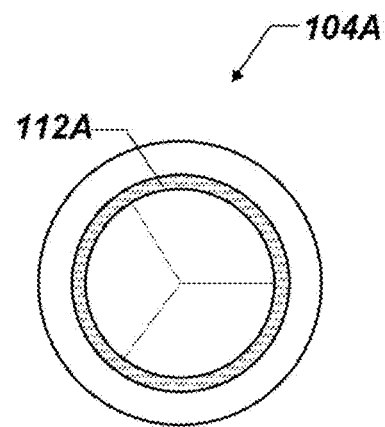

FIG. 4b shows a frontal view of a target object 104A according to the invention, in a first embodiment. In this case, the target object database of the coordinate measuring device 100, 100' according to the invention (see FIGS. 3a, 3b) provides information for a set of defined target objects, at least including a set of defined ID colors which cover certain wavelength ranges and have assigned specifications for a target object.

By means of identification illumination means 109 (see FIGS. 3a, 3b) of an ID camera 108 (see FIGS. 3a and 3b) which is sensitive to the spectrum of wavelength ranges of the ID colors and has a viewing direction along the target axis 11, in particular wherein the ID camera 108 is also intended for providing an overview image for a user, the target object 104A is irradiated with an identification radiation which covers the spectrum of the wavelength ranges of the ID colors, wherein the target object 104A comprises a retroreflecting identification element 112A which, in this case, is situated on the reflector collar 114 (see FIG. 4a) which reflects only radiation of a wavelength range which defines an ID color from the set of defined ID colors.

Within the scope of a target recognition functionality, an automatic recognition, in particular also a localization, of the target object 104A takes place by means of the coordinate measuring device 100, 100', the localization being temporally linked by the evaluation and control unit 107 to an image captured with the aid of the ID camera 108, and wherein an ID color for the recognized target object 104A is determined by way of the evaluation and control unit 107 by means of image processing of an image captured with the aid of the ID camera 108, and an automatic identification of the recognized target object 104A takes place based on the determined ID color of the target object 104A.

An interfering influence by the identification element 112A on the target recognition functionality, for example by means of sighting illuminating means and a target recognition camera 7 (see FIGS. 3a, 3b), can be compensated for, for example, in that the identification element 112A is non-reflective for the wavelength range of a recognition radiation of the target tracking functionality, the target recognition camera 7 is insensitive to radiation from the spectrum of the wavelength ranges of the ID colors, or the radiation reflected on the identification element is taken into consideration, for example masked, by the evaluation and control unit 107, by means of image processing, in an image captured with the aid of the target recognition camera 7.

In addition, the ID camera 108 can be designed in such a way that it is insensitive to radiation outside of the spectrum of the wavelength ranges of the ID colors.

As an alternative to an identification element 112A, which only reflects radiation of one ID color, the identification element itself can be configured in an ID color, for example made of a retroreflecting material.

Since this embodiment does not necessarily require a specific identification radiation, but rather can be operated merely by means of the available—variable—ambient light or by means of the radiation of illumination means of the target recognition unit, an identification element detected by the ID camera 108 has, on the one hand, a comparatively low intensity and, on the other hand, a color influenced by the wavelength range of the ambient light.

In this embodiment, it is therefore advantageous when, within the scope of the target recognition functionality, not only is the target object recognized, but an automatic localization of the recognized target object also takes place, the localization being temporally linked by the evaluation and control unit 107 to an image captured with the aid of the ID camera 108.

In yet another alternative embodiment, the identification element does not have an ID color, but rather an ID pattern, in particular made of a retroreflecting material, wherein the target object database provides a set of defined ID patterns including assigned specifications for a target object, and an identification of the target object takes place on the basis of a determined ID pattern.

In this embodiment as well, it is advantageous when not only the recognition of the target object but also an automatic localization of the recognized target object takes place.

In addition, it is advantageous when the ID camera 108 is designed with a zoom lens having adjustable magnification based on a distance of the target object measured by means of the distance measuring unit, in order to provide an image scale—which is defined and is stored in the target object database—for an image of the target object which has been captured with the aid of the ID camera 108 and has an ID pattern. Alternatively or in addition, for example, a defined image scale can also be provided by means of image processing of the image captured with the aid of the ID camera.

Figure 4C:
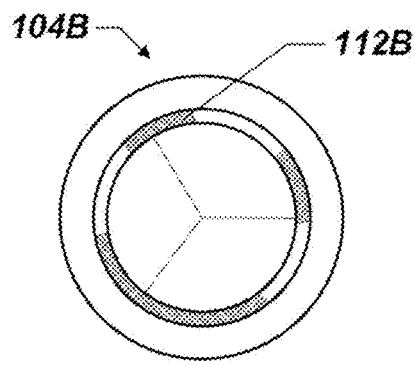

FIG. 4c shows a frontal view of a target object 104B according to the invention in yet another, non-rotationally symmetrical embodiment of the identification element 112B which comprises an ID pattern in this case. This embodiment has the advantage that an image of the identification element 112B captured with the aid of the ID camera 108 (see FIGS. 3a, 3b)—or with the aid of an alternative camera—can likewise be used, by means of image processing by the evaluation and control unit 107, for detecting the spatial orientation of the target object 104B and/or for roughly localizing the target object 104B.

Figure 4D:
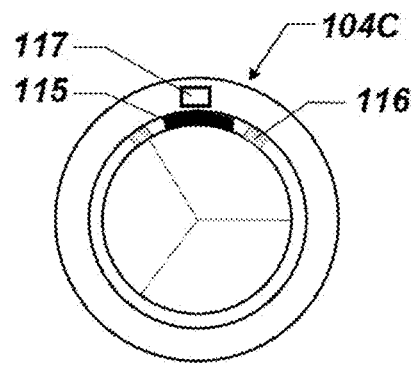

FIG. 4d shows yet another embodiment according to the invention of a target object 104C which is an active target object in this case. In this embodiment, the coordinate measuring device comprises a transmitter unit for transmitting a query signal having a first defined wavelength range, in particular modulated radiation having a defined modulation frequency, and a camera which is sensitive to a second wavelength range and has a viewing direction along a target axis for recording a response signal of at least one target object 104C, in particular wherein the camera is also intended for providing an overview image for a user.

The target object database provides information for a set of defined target objects, at least comprising one set of defined query and response signals including assigned specifications for a target object 104C, wherein the target object 104C comprises a receiver unit 115 which is sensitive to the first wavelength range, and a transmitter unit 116 for emitting a response signal having a defined wavelength range which includes at least a portion of the second wavelength range and, therefore, a response signal of the target object 104C can be detected by the camera.

The target object 104C further comprises a control electronics system, for example a microprocessor 117 in this case, which is in a power-saving mode, wherein the microprocessor 117 can be activated by the receiver unit 115 with the aid of a wake-up signal which is specific for the target object 104C, in order to exit the power-saving mode.

The coordinate measuring device transmits, for example, a query signal which is specific for a target object 104C, or a general flash code. The target object 104C transmits a response signal which is specific for the target object 104C when it receives the query signal or the general flash code. The coordinate measuring device can therefore identify target objects in the visual field of the camera thereof or can directly respond to a specific target object.

Alternatively to an identification of a target object by means of an identification element specifically attached to the target object or a transmission and reception of query and response signals, a target object and an assigned reflector type according to the present invention can also be identified without auxiliary means on the target object, for example by means of an evaluation of measurements with the aid of an intensity detector of the distance measuring unit, an evaluation of an imaging of the reflected tracking beam on a tracking detector, and/or by an imaging of the target object—which is illuminated by a punctiform light source, for example, by the identification illumination means 109—by means of a camera, for example the ID camera 108 (see FIGS. 3a, 3b).

Figure 5A:
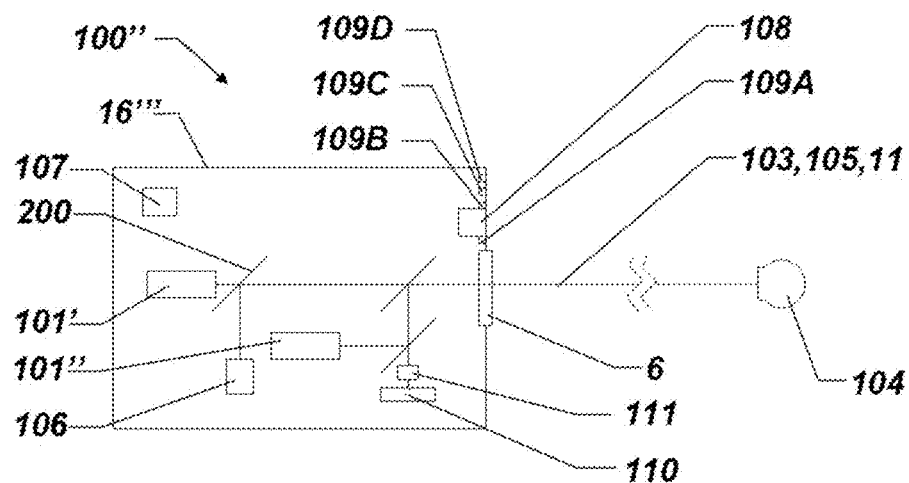
FIGS. 5a,b: show a schematic layout of a coordinate measuring device (a) according to the invention and an exemplary image of the target object (b) captured with the aid of the ID camera for an identification of a target object without an identification element specifically attached to the target object.
Figure 5B:
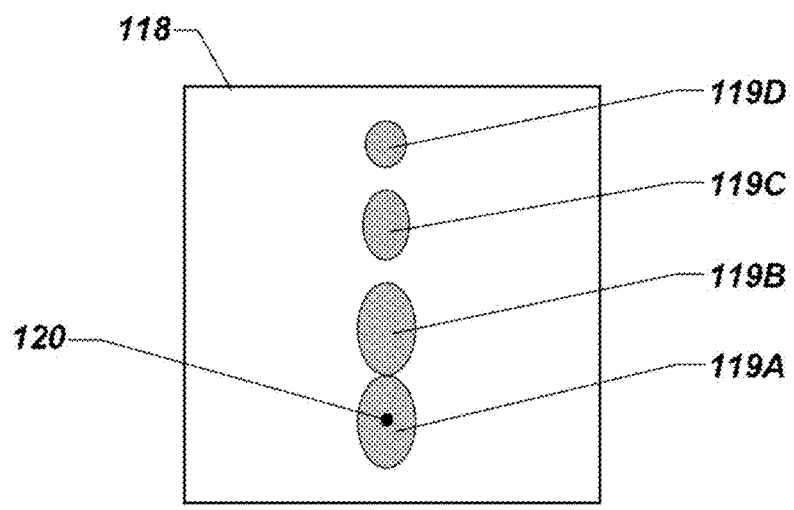

FIGS. 5a and 5b illustrate yet another embodiment of the present invention for identifying a target object 104 without using an identification element specifically attached to the target object 104.

FIG. 5a shows a schematic embodiment of a coordinate measuring device 100" according to the invention, comprising a beam directing unit 16''' which includes essentially the same components and elements as the beam directing unit according to FIG. 3b, although without a separate target recognition camera and without a separate sighting illumination means in this case. In the example shown, the ID camera 108 is used simultaneously as a target recognition camera and, if necessary, as a camera for providing an overview image for a user (see also, for example, the description of FIG. 3a).

In this embodiment, the coordinate measuring device 100" according to the invention also comprises an identification illumination means which is designed as multiple individual light sources, for example LEDs, which are mounted on the sides of the entrance optical system of the ID camera 108 and have a different lateral spacing from the optical axis of the ID camera 108. In the example shown, the coordinate measuring device 100" comprises four separate light sources 109A, 109B, 109C, 109D. The different light sources can generate, for example, radiation in different wavelength ranges for the purpose of improved identification and subsequent differentiation within the scope of an image processing of an image—which has been captured with the aid of the ID camera 108—of the radiation of the identification illumination means reflected on the target object 104.

At least one of the four light sources of the identification radiation, preferably one of the light sources directly on the side of the ID camera 108, is also used in the example shown as sighting illumination means for the target recognition functionality. For example, this main light source 109A provides not only an identification radiation covering a spectrum of wavelength ranges, but also a recognition radiation in a defined wavelength range outside of the spectrum of the identification radiation, wherein the sensitivity of the ID camera 108 for the radiation within and outside of the spectrum of the wavelength ranges of the identification radiation can be regulated, for example by means of a switchable filter functionality (not shown) of the ID camera 108.

The individual light sources are switched on either simultaneously or separately, for example sequentially, in order to irradiate the target object 104. The target object 104 is imaged in an image—which has been captured with the aid of the ID camera 108—using a shape which is specific for every switched-on light source and in a different position depending on the distance between the coordinate measuring device 100" and the target object 104, a lateral diameter of the retroreflector of the target object 104, and the lateral distance between the point of emission (defined, for example, by the particular optical axes) of the light sources 109A, 109B, 109C, 109D and the optical axis of the ID camera 108.

FIG. 5b shows an exemplary image 118 of the target object 104—which has been captured with the aid of the ID camera 108—for a defined distance of the coordinate measuring device 100" to the target object 104, using the identification illumination means from FIG. 5a. The target object 104 is imaged 119A, 119B, 119C, 119D—in the image 118 captured with the aid of the ID camera 108—in a specific shape and a specific position for each light source.

The coordinate measuring device 100" further comprises a target object database which provides information for a set of defined target objects, at least comprising identification features and specifications for a target object irradiated with the aid of the identification illumination means, wherein the identification features include at least the position of a target object—which has been captured within the scope of the target recognition functionality—in an image 118 captured with the aid of the ID camera 104, depending on a distance between the coordinate measuring device 100" and the target object, a lateral diameter of the retroreflector of the target object, and a lateral distance between an emission point of the identification illumination means 109A, 109B, 109C, 109D and an optical axis of the ID camera 108.

Within the scope of a target recognition functionality, an automatic recognition and a localization of a reference position 120 of the recognized target object 104 takes place, for example, specifically for an irradiation of the target object 104 using the main light source 109A, the localization being temporally linked by the evaluation and control unit 107 (see FIG. 5a) to an image 118 captured with the aid of the ID camera 108, and wherein, for example, a shape—imaged specifically for one of the light sources 109A, 109B, 109C, 109D—or position 119A, 119B, 119C, 119D of the imaged target object relative to the reference point 120 is recognized by the evaluation and control unit 107 for the recognized target object 104 by means of image processing of an image 118 captured with the aid of the ID camera 108 and, based on a distance—determined by means of the distance measuring unit—between the coordinate measuring device 100" and the localized target object and based on the specifically imaged shape or position of the target object 119A, 119B, 119C, 119D portrayed by the ID camera 108, an automatic identification of the recognized target object takes place based on the determined distance and the determined position or shape of the localized target object in the image 118 captured with the aid of the ID camera 108.

Figure 6:
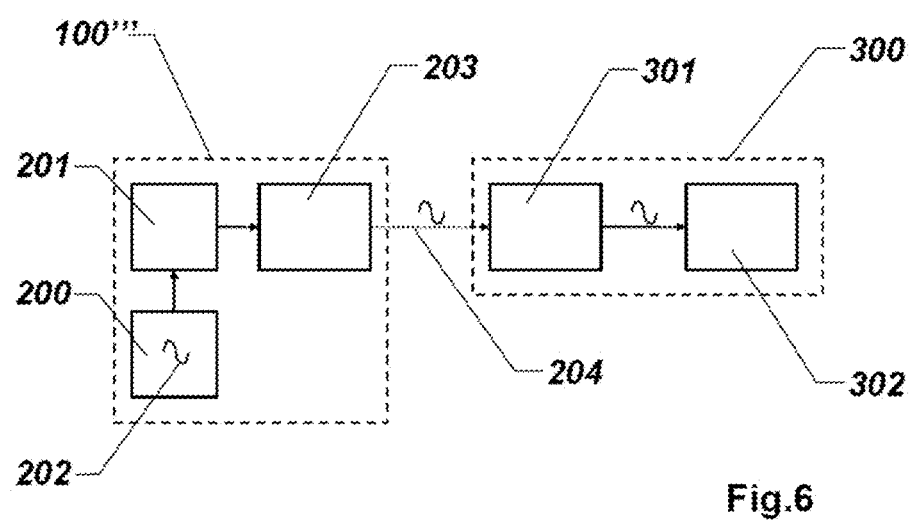
FIG. 6: shows a schematic layout of a calibration, according to the invention, of a system clock for a driver of a distance measurement of a distance measuring module of a coordinate measuring device.

FIG. 6 shows a calibration according to the invention of a system clock 200 for a driver 201 of a distance measurement of a distance measuring module of a coordinate measuring device 100''', which can be used, for example, in a laser tracker. According to the present invention, the clock signal 202—to be calibrated—of the system clock 200 of the coordinate measuring device 100''' is modulated onto an optical beam 204—for example by means of amplitude modulation—provided, for example, by a light source 203 of the distance measuring module of the coordinate measuring device.

The signal source can be configurable, in particular, and can permit an output of several signals to be monitored and can be completely switched off, if necessary.

As a result, an easily accessible, contactless measurement of the driver clock, in particular, is made possible by means of a comparatively simple test device 300, for example by means of a light detector 301 and an analysis unit 302. Since optical radiation is used as a signal carrier, it is also possible, in particular, to output very high frequencies (~GHz) even without complex interfaces.

It is understood that these depicted figures merely schematically represent possible exemplary embodiments. The different approaches can be combined with each other and with methods and devices from the prior art.

In other words, embodiments of the invention relate to the following enumerated statements of subject matter. These enumerated statements are not claims of the application and are not to be construed as limiting the scope of the embodiments of the invention, but are presented to further illustrate and describe selected embodiments:

1. Target object (104, 104A, 104B) for a coordinate measuring device (1, 1', 100, 100', 100", 100'''), in particular a laser tracker, wherein the target object comprises a retroreflective element (3) which can be used within the scope of a coordinate measurement of the target object with the aid of an optical measurement beam (103) of the coordinate measuring device, characterized in that
the target object comprises an identification element (112A, 112B) which is visible to and recognizable by the coordinate measuring device, wherein the identification element comprises at least one element from the following group
  a retroreflecting identification element (112A) which retroreflects only radiation of a defined ID color covering at least one certain wavelength range,
  an identification element (112A) having a defined ID color covering at least one certain wavelength range, and
  an identification element (112B) having a defined ID pattern, in particular made of retroreflecting material,
in particular wherein the identification element is configured to be rotationally asymmetrical with respect to a target axis (11) of the coordinate measuring device defined within the scope of the coordinate measurement.

2. Coordinate measuring device (100, 100', 100", 100'''), in particular a laser tracker, for detecting a position of a target object (104, 104A, 104B, 104C) which can move in space and which comprises a retroreflector (3), in particular a target object according to subject matter 1, at least comprising
  a radiation source (101, 101') for emitting an optical measurement beam (103), wherein the measurement beam is emitted in a defined spatial direction by means of a beam directing unit (16, 16', 16", 16''') and thus defines a target axis (11),
  a distance measuring functionality (106) for determining a distance to the target object by means of the measurement beam (103),
  an angle measuring functionality for determining a direction of emission of the measurement beam (103),
  a target tracking functionality for the continuous tracking of the target object, and
  an evaluation and control unit (107) for data storage and for the control of the
  coordinate measuring device,
characterized in that
the coordinate measuring device further comprises
  a target object database which is stored in the evaluation and control unit and provides information for a set of individual target objects, at least including
    specifications assigned to each of the individual target objects, and
    ID colors, each of which is assigned to an individual target object and covers at least one certain wavelength range, the ID colors being unambiguously distinguishable from one another, wherein precisely one ID color is assigned to precisely one target object,
  a camera which is sensitive to the spectrum of the wavelength ranges of the ID colors, is referred to in the following as an ID camera (108), and is based, in particular, on a CCD- or CMOS-sensor, and
  illumination means (109, 109A, 109B, 109C, 109D) for illuminating a target object with an identification radiation covering the spectrum of the wavelength ranges of the ID colors,
wherein, within the scope of an identification functionality automatically controlled by the evaluation and control unit
  a target object to be identified is irradiated with the identification radiation,
  a determination of an ID color for the target object takes place based on an image of the target object captured with the aid of the ID camera,
  an automatic identification of the target object takes place based on the ID color of the target object, and
  an, in particular automatic, allocation of the assigned specifications to the target object takes place based on the information provided by the target object database.

3. Coordinate measuring device (100, 100', 100", 100''') according to subject matter 2, characterized in that
the coordinate measuring device further has a target recognition functionality for orienting the measurement beam (103) toward the target object, in particular including a regulating unit for an automatic search and recognition of the target object,
the target recognition functionality is implemented by means of a recognition radiation provided in a defined wavelength range within the scope of the target recognition functionality, in particular being generated by the illumination means (109, 109A, 109B, 109C, 109D) generating the identification radiation or by additional target recognition illumination means (8),
in particular wherein
  the ID camera is sensitive to at least one portion of the wavelength range of the recognition radiation and is provided for use as a target recognition camera, in particular wherein
    the recognition radiation is provided in a defined wavelength range outside of the spectrum of the wavelength ranges of the ID colors, and/or
    the portions of the recognition radiation returning from the target object are taken into consideration, in particular are masked, by the evaluation and control unit, within the scope of the identification functionality, in an image of the target object captured with the aid of the ID camera,
or
  the target recognition functionality is implemented with the aid of a dedicated target detection camera (7) and the ID camera (108) is insensitive to the wavelength range of the recognition radiation,
or
  the target recognition functionality is implemented with the aid of a dedicated target recognition camera and the recognition radiation is provided in a defined wavelength range outside of the spectrum of the wavelength ranges of the ID colors, in particular wherein
    the target recognition camera is insensitive to radiation from the spectrum of the wavelength ranges of the ID colors, and/or
    the portions of the identification radiation returning from the target object are taken into consideration, in particular are masked, by the evaluation and control unit, within the scope of the target recognition functionality, in an image of the target object captured with the aid of the target recognition camera.

4. Coordinate measuring device (100, 100', 100", 100''') according to any one of subject matters 1 to 3, characterized in that
the identification radiation is switched on only for the identification of the target object.

5. Coordinate measuring device (100, 100', 100", 100'''), in particular a laser tracker, for detecting a position of a target object (104, 104A, 104B, 104C) which can move in space and which comprises a retroreflector (3), wherein the coordinate measuring device at least comprises
- a radiation source (101, 101') for emitting an optical measurement beam (103), wherein the measurement beam is emitted in a defined spatial direction by means of a beam directing unit (16, 16', 16", 16''') and thus defines a target axis (11),
- a distance measuring functionality (106) for determining a distance to the target object by means of the measurement beam (103),
- an angle measuring functionality for determining a direction of emission of the measurement beam (103),
- a target tracking functionality for the continuous tracking of the target object, and
- an evaluation and control unit (107) for data storage and for the control of the coordinate measuring device, characterized in that
the coordinate measuring device comprises a target object database which is stored in the evaluation and control unit and provides information for a set of individual target objects, at least including
specifications assigned to each of the individual target objects, and
values of differentiation parameters assigned to each of the individual target objects, wherein the differentiation parameters comprise at least one element from the following group
- a parameter which stands for a total retroreflective capability of a target object, in particular a ratio of radiation incident on the target object with respect to the portion of the incident radiation which has been retroreflected on the particular target object, and
- a parameter which stands for an aperture size of the retroreflector of a target object, in particular a diameter or an area of an image of the retroreflector of the particular target object captured with the aid of a area detector from a defined distance,
wherein, within the scope of an identification functionality automatically controlled by the evaluation and control unit for a target object to be identified, at least one identification element from the following group is determined
- a value of the intensity signal of the target object registered with the aid of an intensity detector (7, 9, 106, 108, 110),
- a diameter or an area of an image of the target object captured with the aid of an area detector (7, 9, 108, 110),
wherein
an automatic identification of the target object takes place based on the determined identification element, in particular wherein, for the purpose of the identification, the identification element is set into relation to a distance to the target object determined with the aid of the distance measuring functionality, and
an allocation of the assigned specifications to the target object takes place based on the information provided by the target object database.

6. Coordinate measuring device (100, 100', 100", 100''') according to subject matter 5, characterized in that the distance measuring functionality comprises an absolute distance measuring unit and the identification of the target object takes place based on a distance to the target object measured with the aid of the absolute distance measuring unit.

7. Coordinate measuring device (100, 100', 100", 100''') according to subject matter 5 or 6, characterized in that the intensity detector is used in at least one of the following functions
- as a dedicated identification detector of the coordinate measuring device (108),
- as a receiver of the distance measuring functionality (106), in particular wherein the intensity detector is used within the scope of at least one of the following distance measuring units,
  - a unit for measuring propagation time,
  - an interferometer unit,
  - a WFD unit,
  - a FMCW unit,
  - a frequency comb unit,
  - a phase distance measuring unit, and
  - a Fizeau absolute distance measuring unit,
- as a tracking detector (110) of the target tracking functionality, in particular being configured as a position-sensitive detector (PSD),
- as a target recognition detector (7) of a target recognition functionality of the coordinate measuring device for orienting the measurement beam (103) toward the target object,
- as a target recognition detector of a stereo target recognition functionality of the coordinate measuring device for orienting the measurement beam (103) onto the target object and for determining a distance to the target object, and/or the area detector is used in at least one of the following functions
- as a dedicated identification detector of the coordinate measuring device (108),
- as a tracking detector (110) of the target tracking functionality, in particular being configured as a position-sensitive CCD- or CMOS-camera,
- as a target recognition detector (7) of a target recognition functionality of the coordinate measuring device for orienting the measurement beam (103) onto the target object,
- as a target recognition detector of a stereo target recognition functionality of the coordinate measuring device for orienting the measurement beam (103) onto the target object and for determining a distance to the target object,
- as a camera (9) for providing an overview image for a user.

8. Coordinate measuring device (100, 100', 100", 100''') according to any one of subject matters 5 to 7, characterized in that
the identification within the scope of the automatic identification of the target object defines a first comparison parameter,
yet another identification of the target object based on an alternative method takes place, in particular an alternative manual or automatic method, wherein the further identification defines a second comparison parameter, and
a comparison of the first comparison parameter with the second comparison parameter takes place and, on the basis of the comparison, a state of the target object is derived, in particular a defect or a degree of soiling of the target object.

9. Coordinate measuring device (100, 100', 100", 100'''), in particular a laser tracker, for detecting a position of a target object (104, 104A, 104B, 104C) which can move in space and which comprises a retroreflector (3), wherein the coordinate measuring device at least comprises
    a radiation source (101, 101') for emitting an optical measurement beam (103), wherein the measurement beam is emitted in a defined spatial direction by means of a beam directing unit (16, 16', 16", 16''') and thus defines a target axis (11),
    a distance measuring functionality (106) for determining a distance to the target object by means of the measurement beam (103),
    an angle measuring functionality for determining a direction of emission of the measurement beam (103),
    a target tracking functionality for the continuous tracking of the target object, and
    an evaluation and control unit (107) for data storage and for the control of the coordinate measuring device,
    characterized in that
    the coordinate measuring device comprises
    illumination means (109, 109A, 109B, 109C, 109D) for illuminating the target object with an identification radiation in a defined wavelength range, in particular being configured as an LED,
    a camera referred to in the following as an ID camera (108) which is sensitive at least to a portion of the wavelength range of the identification radiation, in particular based on a CCD- or CMOS-sensor, and
    a target object database which is stored in the evaluation and control unit and provides information for a set of individual target objects, at least including
        specifications assigned to each of the individual target objects,
        positions assigned to the individual target objects or deviations from the target axis (11) in an image captured by the ID camera of the individual target object irradiated with the illumination means, depending on
            a distance between the coordinate measuring device and the individual object,
            a lateral diameter of the retroreflector (3) of the individual target object, and
            a lateral distance between an optical axis of the illumination means and an optical axis of the ID camera,
    wherein, within the scope of an identification functionality for the target object to be identified, the target object is detected with respect to the target axis (11) and, automatically controlled by the evaluation and control unit,
    a determination of a distance between the coordinate measuring device and the target object takes place by means of the distance measuring functionality,
    a determination of a position of the target object takes place in an image—captured with the aid of the ID camera—of the target object irradiated with the identification radiation,
    an automatic identification of the target object takes place based on the determined distance and the determined position of the target object in the image captured by the ID camera, and
    an allocation of the assigned specifications to the target object takes place based on the information provided by the target object database.

10. Coordinate measuring device (100, 100', 100", 100''') according to subject matter 9, characterized in that
    the illumination means (109, 109A, 109B, 109C, 109D) are configured as multiple individual light sources, in particular as LEDs, which are mounted on the sides of the entrance optical system of the ID camera (108), wherein the optical axes of the individual light sources each have different lateral spacing from the optical axis of the ID camera, in particular wherein the individual light sources generate radiation in defined wavelength ranges which differ from each other,
    in particular wherein
    at least one first light source of the illumination means (109, 109A, 109B, 109C, 109D) is also provided as sighting illumination means for a target recognition functionality of the coordinate measuring device for orienting the measurement beam (103) toward the target object, in particular wherein the first light source provides a portion of the identification radiation and the recognition radiation.

11. Coordinate measuring device (100, 100', 100", 100''') according to any one of subject matters 9 to 10, characterized in that
    the individual light sources of the illumination means (109, 109A, 109B, 109C, 109D) can be switched on and off by the evaluation and control unit simultaneously or separately, in particular sequentially, wherein a switching on and/or off of the light sources is temporally linked to an image-capturing by means of the ID camera (108).

12. Coordinate measuring device (100, 100', 100", 100'''), in particular a laser tracker, for detecting a position of a target object (104, 104A, 104B, 104C) which can move in space and which comprises a retroreflector (3), in particular a target object according to subject matter 1, at least comprising
    a radiation source (101, 101') for emitting an optical measurement beam (103), wherein the measurement beam is emitted in a defined spatial direction by means of a beam directing unit (16, 16', 16", 16''') and thus defines a target axis (11),
    a distance measuring functionality for determining a distance to the target object by means of the measurement beam,
    an angle measuring functionality for determining a direction of emission of the measurement beam,
    a target tracking functionality for the continuous tracking of the target object, and
    an evaluation and control unit (107) for data storage and for the control of the coordinate measuring device,
    characterized in that
    the coordinate measuring device further comprises
    a target object database which is stored in the evaluation and control unit and provides information for a set of individual target objects, at least including
        specifications assigned to each of the individual target objects, and
        ID patterns which are assigned to each of the individual target objects and which can be unambiguously differentiated from one another, wherein precisely one ID pattern is assigned to precisely one target object, a camera referred to in the following as an ID camera (108), in particular based on a CCD- or CMOS-sensor, in particular wherein the ID camera is configured to have a zoom lens having an adjustable magnification based on a distance to the target object measured with the aid of the distance measuring functionality (106), and the viewing direction of the camera (108) is along an axis which is parallel or coaxial to the target axis (11), wherein, within the scope of an identification functionality automatically controlled by the evaluation and control unit a determination of an ID pattern for the target object takes place based on an image of the target object captured with the aid of the ID camera, an automatic identification of the target object takes place based on the ID pattern of the target object, and an, in particular automatic, allocation of the assigned specifications to the target object takes place based on the information provided by the target object database.

13. Coordinate measuring device (100, 100', 100", 100''') according to subject matter 12, characterized in that the determination of the ID pattern for the target object (104, 104A, 104B, 104C) takes place by way of
    adjusting a defined image scale of the image captured with the aid of the ID camera (108), and/or
    capturing an image with the aid of the ID camera in a defined image scale by means of a suitable adjustment of the zoom lens based on a distance of the target object measured with the aid of the distance measuring functionality (106).

14. Coordinate measuring system comprising a coordinate measuring device (100, 100', 100", 100'''), in particular a laser tracker, and a target object (104, 104A, 104B, 104C) comprising a retroreflector (3), wherein the coordinate measuring device at least comprises
    a radiation source (101, 101') for emitting an optical measurement beam (103), wherein the measurement beam is emitted in a defined spatial direction by means of a beam directing unit (16, 16', 16", 16''') and thus defines a target axis (11),
    a distance measuring functionality (106) for determining a distance to the target object by means of the measurement beam (103),
    an angle measuring functionality for determining a direction of emission of the measurement beam (103),
    a target tracking functionality for the continuous tracking of the target object, and
    an evaluation and control unit (107) for data storage and for the control of the coordinate measuring device,
    characterized in that
    the coordinate measuring device comprises
        a first transmitter unit for transmitting a query signal having a first defined wavelength range, in particular modulated radiation having a defined modulation frequency,
        a camera (7, 9, 106, 108, 110) which is sensitive to a second wavelength range and which has a viewing direction along the target axis (11) for capturing a response signal from at least one target object, and
        a target object database which is stored in the evaluation and control unit and provides information for a set of individual target objects, at least including specifications assigned to each of the individual target objects, and
        query and response signals assigned to each of the individual target objects,
    the target object comprises
        a receiver unit (115) which is sensitive to the first wavelength range,
        a second transmitter unit (116) for emitting a response signal having a defined wavelength range which includes at least a portion of the second wavelength range, and
        a control electronics system, in particular a microprocessor (117), which is in a power-saving mode, wherein the control electronics system can be activated by the receiver unit with the aid of a wake-up signal which is specific for the target object, in order to exit the power-saving mode,
    wherein the evaluation and control unit automatically identifies at least one target object irradiated with the aid of the first transmitter unit and carries out an allocation of the assigned specifications of the target object based on the information provided by the target object database, based on
        a transmission of a query signal by the first transmitter unit of the coordinate measuring device based on the information provided by the target object database, and
        a reception of the transmitted query signal with the aid of a first receiver unit (115) of at least one first target object,
        wherein, in the event of conformance of the query signal received by the receiver unit of the first target object with the wake-up signal which is specific for the first target object, the control electronics system (117) of the first target object is activated and the first target object transmits, by means of the second transmitter unit (116), a response signal which is captured by the camera (7, 9, 106, 108, 110), and the identity of the first target object irradiated with the query signal is derived by the evaluation and control unit.

15. Coordinate measuring system according to subject matter 14,
    characterized in that
        a first query signal is specific for the first target object, and wherein a response signal confirms the identity of the first target object, in particular wherein a coarse position of the first target object relative to the coordinate measuring device is derived on the basis of an image of the first response signal captured by the camera, and/or
        a second query signal is a trigger signal, and wherein, due to the trigger signal, a second target object transmits a second response signal, wherein the evaluation and control unit derives the identity of the second target object based on the second response signal and the information provided by the target object database, in particular wherein a coarse position of the second target object relative to the coordinate measuring device is derived on the basis of an image of the second response signal captured by the camera.

16. Coordinate measuring device (7, 9, 106, 108, 110), in particular a laser tracker, for detecting a position of a target object (104, 104A, 104B, 104C) which can move in space and which comprises a retroreflector (3), in particular a target object according to subject matter 1, wherein the coordinate measuring device at least comprises
- a radiation source (101, 101') for emitting an optical measurement beam (103), wherein the measurement beam is emitted in a defined spatial direction by means of a beam directing unit (16, 16', 16'', 16''') and thus defines a target axis (11),
- a distance measuring functionality (106) for determining a distance to the target object by means of the measurement beam (103),
- an angle measuring functionality for determining a direction of emission of the measurement beam (103),
- a target tracking functionality for the continuous tracking of the target object, and
- an evaluation and control unit (107) for data storage and for the control of the coordinate measuring device, characterized in that the coordinate measuring device further comprises
- a target object database which is stored in the evaluation and control unit and provides information for a set of individual target objects, at least including specifications assigned to each of the individual target objects, and
- ID colors, each of which is assigned to an individual target object and covers at least one certain wavelength range, the ID colors being unambiguously distinguishable from one another, wherein precisely one ID color is assigned to precisely one target object,
- a camera which is sensitive to the spectrum of the wavelength ranges of the ID colors, is referred to in the following as an ID camera (108), and is based, in particular, on a CCD- or CMOS-sensor, wherein, within the scope of an identification functionality automatically controlled by the evaluation and control unit
- a determination of an ID color for the target object takes place based on an image of the target object captured with the aid of the ID camera (108),
- an automatic identification of the target object takes place based on the ID color of the target object, and
- an, in particular automatic, allocation of the specifications to the target object takes place based on the information provided by the target object database.

The invention claimed is:

1. A coordinate measuring device for detecting a position of a target object capable of moving in space and which includes a retroreflector, wherein the coordinate measuring device comprises:
a radiation source which emits an optical measurement beam, wherein the measurement beam is emitted in a defined spatial direction by means of a beam directing unit and thus defines a target axis;
a distance measuring means for determining a distance to the target object by means of the optical measurement beam;
an angle measuring means for determining a direction of emission of the optical measurement beam;
a target tracking functionality for continuously tracking the target object, and
an evaluation and control unit for performing data storage and controlling the coordinate measuring device;
an illumination means for illuminating the target object with an identification radiation in a defined wavelength range;
a camera which is sensitive at least to a portion of the wavelength range of the identification radiation; and
a target object database which is stored in the evaluation and control unit and which provides information for a set of individual target objects, at least including:
specifications assigned to each of the individual target objects,
positions assigned to the individual target objects or deviations from the target axis in an image captured by the camera of the individual target object irradiated with the illumination means, depending on
a distance between the coordinate measuring device and the individual object,
a lateral diameter of the retroreflector of the individual target object, and
a lateral distance between an optical axis of the illumination means and an optical axis of the camera,
wherein the target object is detected with respect to the target axis and the evaluation and control unit perform:
a determination of a distance between the coordinate measuring device and the target object by means of the distance measuring functionality,
a determination of a position of the target object in an image captured by camera of the target object irradiated with the identification radiation,
an automatic identification of the target object based on the determined distance and the determined position of the target object in the image captured by the camera, and
an allocation of the assigned specifications to the target object based on the information provided by the target object database.

2. The coordinate measuring device according to claim 1, wherein:
the illumination means are configured as multiple individual light sources mounted on the sides of the entrance optical system of the camera, wherein the optical axes of the individual light sources each have different lateral spacing from the optical axis of the camera.

3. The coordinate measuring device according to claim 2, wherein at least one first light source of the illumination means comprises a sighting illumination means for a target recognition functionality of the coordinate measuring device for orienting the measurement beam toward the target object.

4. The coordinate measuring device according to claim 1, wherein the individual light sources of the illumination means are configured to be switched on and off by the evaluation and control unit simultaneously or separately, and wherein a switching on or off of the light sources is temporally linked to an image-capturing by means of the camera.

5. A coordinate measuring device for detecting a position of a target object which is moveable in space and which includes a retroreflector, the coordinate measuring device comprising:
a radiation source for emitting an optical measurement beam, wherein the measurement beam is emitted in a defined spatial direction by means of a beam directing unit and thus defines a target axis;

a distance measuring functionality for determining a distance to the target object by means of the measurement beam;
an angle measuring functionality for determining a direction of emission of the measurement beam;
a target tracking functionality for the continuous tracking of the target object;
an evaluation and control unit for data storage and controlling the coordinate measuring device,
a target object database which is stored in the evaluation and control unit and provides information for a set of individual target objects, at least including:
  specifications assigned to each of the individual target objects, and
  ID patterns which are assigned to each of the individual target objects and which can be unambiguously differentiated from one another, wherein precisely one ID pattern is assigned to precisely one target object,
a camera, wherein the viewing direction of the camera is along an axis which is parallel or coaxial to the target axis,
wherein the target object is detected with respect to the target axis and the evaluation and control unit perform:
determining an ID pattern for the target object takes place based on an image of the target object captured with the aid of the ID camera,
an automatic identification of the target object based on the ID pattern of the target object, and
allocating of the assigned specifications to the target object takes place based on the information provided by the target object database,
wherein determining the ID pattern for the target object comprises:
adjusting a defined image scale of the image captured with the aid of the ID camera, or capturing an image with the aid of the ID camera in a defined image scale by means of a suitable adjustment of the zoom lens based on a distance of the target object measured with the aid of the distance measuring functionality.

6. A coordinate measuring device for detecting a position of a target object which can move in space and which includes a retroreflector, wherein the coordinate measuring device comprises:
  a radiation source for emitting an optical measurement beam, wherein the measurement beam is emitted in a defined spatial direction by means of a beam directing unit and thus defines a target axis;
  a distance measuring means for determining a distance to the target object by means of the measurement beam;
  an angle measuring means for determining a direction of emission of the measurement beam;
  a target tracking functionality for the continuous tracking of the target object;
  an evaluation and control unit for data storage and for the control of the coordinate measuring device;
  a target object database which is stored in the evaluation and control unit and provides information for a set of individual target objects, at least including:
    specifications assigned to each of the individual target objects, and
    ID colors, each of which is assigned to an individual target object and covers at least one certain wavelength range, the ID colors being unambiguously distinguishable from one another, wherein precisely one ID color is assigned to precisely one target object, and
  a camera which is sensitive to the spectrum of the wavelength ranges of the ID colors;
  wherein the target object is detected with respect to the target axis and the evaluation and control unit perform:
  a determination of an ID color for the target object takes place based on an image of the target object captured with the aid of the camera,
  an automatic identification of the target object takes place based on the ID color of the target object, and
  an allocation of the specifications to the target object takes place based on the information provided by the target object database.

7. The coordinate measuring device according to claim 6, wherein:
  the illumination means are configured as multiple individual light sources mounted on the sides of the entrance optical system of the camera, wherein the optical axes of the individual light sources each have different lateral spacing from the optical axis of the camera.

8. The coordinate measuring device according to claim 7, wherein at least one first light source of the illumination means comprises a sighting illumination means for a target recognition functionality of the coordinate measuring device for orienting the measurement beam toward the target object.

9. The coordinate measuring device according to claim 6, wherein the individual light sources of the illumination means are configured to be switched on and off by the evaluation and control unit simultaneously or separately, and wherein a switching on or off of the light sources is temporally linked to an image-capturing by means of the camera.

* * * * *